United States Patent [19]

Matsuo et al.

[11] 4,208,500
[45] Jun. 17, 1980

[54] ACRYLIC COPOLYMER VULCANIZATES

[75] Inventors: Tadao Matsuo; Satoshi Mashimo; Eiichi Takami, all of Kobe; Kyoichi Mishima, Nishinomiya; Hiroshi Namizashi; Etsuji Uenoyama, both of Kobe; Masanori Kakei, Toyonaka, all of Japan

[73] Assignee: Mitsuboshi Belting Limited, Kobe, Japan

[21] Appl. No.: 961,064

[22] Filed: Nov. 15, 1978

Related U.S. Application Data

[63] Continuation of Ser. No. 722,466, Sep. 13, 1976, abandoned.

[30] Foreign Application Priority Data

Sep. 12, 1975 [JP] Japan .................................. 50-111452

[51] Int. Cl.² .............................................. C08F 8/34
[52] U.S. Cl. ............................... 526/217; 260/23 AR; 525/535; 526/282
[58] Field of Search ...................... 526/41, 217, 282; 260/23 AR; 525/535

[56] References Cited

U.S. PATENT DOCUMENTS

| | | | |
|---|---|---|---|
| 3,093,620 | 6/1963 | Gladding et al. | 526/41 |
| 3,271,477 | 9/1966 | Kresge | 526/41 |
| 3,402,158 | 9/1968 | Santaniello et al. | 526/41 |
| 3,487,054 | 12/1969 | Minnerly et al. | 526/41 |
| 3,651,176 | 3/1972 | Usamoto et al. | 526/41 |
| 3,658,770 | 4/1972 | Longi et al. | 526/41 |
| 3,920,623 | 11/1975 | Khan | 526/41 |
| 3,975,324 | 8/1976 | Behrens | 526/41 |
| 4,028,316 | 6/1977 | Matsuo et al. | 526/41 |

OTHER PUBLICATIONS

Chemical Abstracts, vol. 81, No. 24, Dec. 16, 1974, p. 15427Y.

*Primary Examiner*—Ronald W. Griffin
*Attorney, Agent, or Firm*—Sughrue, Rothwell, Mion, Zinn and Macpeak

[57] ABSTRACT

An acrylic copolymer vulcanizate, which is a sulfur-vulcanized product of an acrylic copolymer, the acrylic copolymer being obtained by the radical polymerization of a monomeric mixture consisting essentially of 100 parts by weight of at least one acrylic acid ester of an aliphatic alcohol containing 1 to 8 carbon atoms and about 1 to about 15 parts by weight of a 5-substituted-2-norbornene of the general formula

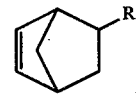

wherein R represents $=CH{-}(CH_2){-}_xCH_3$, in which $x$ is 0 to 4, or $-CH{=}CH_2$, in the presence of about 0.05 to about 3.0 parts by weight, per 100 parts by weight of the monomeric mixture, of a sulfur vulcanization accelerator which does not cause degradative chain transfer.

23 Claims, 2 Drawing Figures

RHEOMETER CURVE
(153°C x 40 min.)

ACRYLIC COPOLYMER VULCANIZATES

This is a Continuation of application Ser. No. 722,466, filed Sept. 13, 1976, now abandoned.

BACKGROUND OF THE INVENTION

1. Field of the Invention

This invention relates to a sulfur-vulcanized acrylic copolymer. More specifically, the invention provides an acrylic copolymer vulcanizate resulting from the vulcanization of a copolymer which is obtained by the radical polymerization of an acrylic acid ester, a 5-substituted-2-norbornene of the general formula

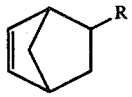

wherein R represents $=CH-(CH_2)_xCH_3$, in which $x$ is 0 to 4, or $-CH=CH_2$,
and acrylonitrile or an alkyl methacrylate, etc., which is selected according to the required service of the resulting vulcanized rubber, in the presence of a sulfur-vulcanization accelerator that does not cause degradative chain transfer, such as 2-mercaptobenzothiazole.

DESCRIPTION OF THE PRIOR ART

Generally, most acrylic copolymers (referred to hereafter as acrylic rubbers) are prepared by copolymerizing ethyl acrylate or butyl acrylate, etc., as a main component and acrylonitrile, styrene, methyl methacrylate, etc., which are selected according to the required service.

Furthermore, it is known to add a chlorine compound (such as 2-chloroethyl acrylate or vinyl chloroacetate) or an epoxy compound (such as allyl glycidyl ether, glycidyl acrylate or glycidyl methacrylate) during such copolymerizations in order to facilitate the vulcanization of the resulting copolymers.

As curing agents for these acrylic rubbers, a mixture of triethylene tetramine and dibenzothiazyl disulfide, a combination of a trimene base (a reaction product of ethyl chloride, formaldehyde and ammonia) and sulfur, ammonium salts of organic carboxylic acids, dithiocarbamic acid salts, and thiourea derivatives are generally used.

Where amines are used as vulcanizing agents, the resulting vulcanizates cannot generally be used in the medical, foodstuff and sanitary fields. Furthermore, in many cses, amines tend to corrode iron molds, and also metals used as a core in rubber products or tension members, thus shortening the lives of these products. This poses an especially serious problem in rubber-timing belts which use a steel wire as a tension member.

Frequently, sulfur vulcanization of natural rubbers and diene-type rubbers (typified by SBR) is performed at a temperature of 130° to 160° C., and methods of heating them with high temperature steam are widely employed for commercial operations. Known soap-sulfur vulcanizable systems for acrylic rubbers can obviate the defects associated with acrylic rubbers cured with amines, but unless they are vulcanized at 170° to 190° C., vulcanizates having satisfactory properties cannot be obtained. In addition, with presses utilizing steam, it is not economical to obtain such high temperatures.

The chlorine-type and epoxy-type vulcanization systems mentioned hereinabove have the defect that unless they are postcured at 150° to 220° C. for 5 to 24 hours after vulcanization, vulcanizates having satisfactory properties cannot be obtained.

On the other hand, acrylic rubbers which can use sulfur vulcanizates having various characteristics without impairing the thermal stability and oil resistance of the acrylic rubbers have been produced by connecting the main chains of acrylic rubbers by a saturated hydrocarbon and introducing a double bond into the side chains. Examples of such acrylic rubbers are copolymers obtained by copolymerizing acrylate esters with curing comonomers such as tetrahydrobenzyl acrylate or an acrylate of hydroxydicyclopentadiene. In their rheometer cure curves, such rubbers, after a suitable scorch time, show a rise of a steep gradient, which is followed by a flat plateau. Such cure characteristics ensure improved procesability of these modified acrylic rubbers and increased uniformity of the quality of the vulcanizates obtained therefrom. Furthermore, they can provide vulcanizates having suitable properties without the need for post curing, and it is easy to improve their thermal stability and oil resistance by blending them with other sulfur-vulcanizable rubbers. Moreover, when such an acrylic rubber is bonded to a different kind of rubber and cured under heat and pressure to obtain a co-vulcanizate, it is easy to match the vulcanization speeds of the two rubbers with each other, and therefore to obtain higher adhesion strength. Accordingly, these modified acrylic rubbers have superior serviceability with various conventional acrylic rubbers as described hereinabove. These acrylic rubbers, however, have the serious defect that they are susceptible to hydrolysis because the ester residues which enable sulfur vulcanization are bonded to the main polymer chains by an ester linkage.

In an attempt to remedy such a defect, methods have already been suggested to copolymerize dicyclopentadiene (see U.S. Pat. No. 3,402,158, and British Pat. No. 1,062,969), or its dimer (see U.S. Pat. No. 3,487,054), or an alkylidene norbornene (see Japanese Patent Applications (Laid-Open) 87787/74 and 25656/75) as a comonomer with acrylic acid esters. The resulting acrylic rubbers can be vulcanized with sulfur, but the speed of vulcanization is not sufficiently high. In particular, while acrylic rubbers having alkylidene norbornenes copolymerized therewith may exhibit a satisfactory vulcanization speed, depending upon a proper choice of the vulcanization system, they still suffer from the disadvantage that gellation of the polymer proceeds during the copolymerization reaction, and it is difficult to add fillers or reinforcing agents, such as carbon black, to the resulting polymer. Hence, their processability is insufficient, and in order to make up for this deficiency, it is common to increase roll workability by adding a plasticizer such as a liquid polyester.

SUMMARY OF THE INVENTION

Accordingly, it is one object of this invention to provide an acrylic copolymer rubber having good processability which is easily bonded around rolls and mixed by rolling operations.

Another object of this invention is to provide an acrylic copolymer vulcanizate having superior vulcanization characteristics, especially superior mechanical properties.

Still another object of the present invention is to increase the vulcanization rate of an acrylic copolymer obtained using a sulfur vulcanization accelerator which does not cause degradative chain transfer.

The present invention provides an acrylic copolymer vulcanizate, which is a sulfur-vulcanized product of an acrylic copolymer, the copolymer being obtained by the radical polymerization of a monomeric mixture consisting essentially of 100 parts by weight of at least one acrylic acid ester of an aliphatic alcohol containing 1 to 8 carbon atoms and about 1 to about 15 parts by weight of a 5-substituted-2-norbornene of the general formula

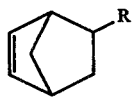

wherein R represents $=CH\!-\!(CH_2)_xCH_3$, in which x is 0 to 4, or $-CH=CH_2$,
in the presence of about 0.05 to about 3.0 parts by weight, per 100 parts by weight of the monomeric mixture, of a sulfur-vulcanization accelerator which does not cause degradative chain transfer.

DETAILED DESCRIPTION OF THE INVENTION

Figure 1:
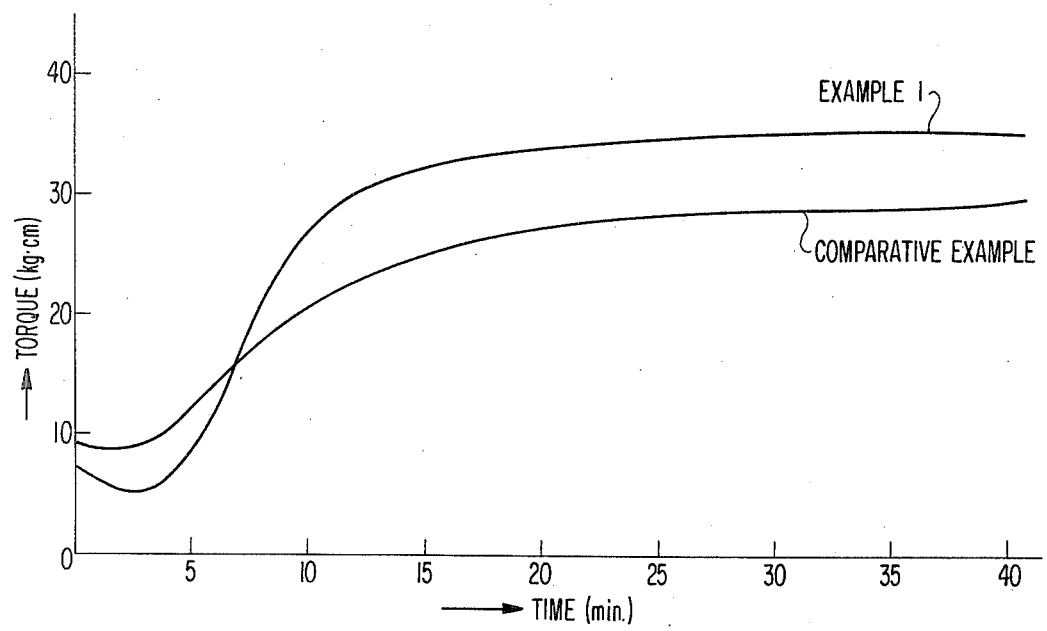
FIG. 1 shows a rheometer curve of Example 1 and the Comparative Example for the sake of comparison.

Examples of the acrylic acid esters of aliphatic alcohols containing 1 to 8 carbon atoms (compound A) used in this invention are methyl acrylate, ethyl acrylate, propyl acrylate, n-butyl acrylate, i-butyl acrylate, pentyl acrylate, hexyl acrylate, 2-ethyl-hexyl acrylate, and octyl acrylate. They can be used either alone or in admixture of two or more. Of these, ethyl acrylate and butyl acrylate are especially preferred because they give good results. As the chains of the ester residues in these compounds become longer and more branched, these acrylate esters cause a lower glass transition temperatures and a higher repulsive elasticity, but, on the other hand, cause reduced tensile strength and debase oil resistance and thermal stability. Accordingly, the acrylate esters should desirably be chosen properly according to the required service of the resulting acrylic rubber products.

The 5-substituted-2-norbornene (compound B) used in the present invention is represented by the general formula

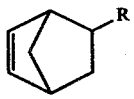

wherein R represents $=CH\!-\!(CH_2)_xCH_3$ in which x is 0 to 4, or $-CH=CH_2$.
Typical examples are ethylidene norbornene, propylidene norbornene, and vinyl norbornene.

Usually, the 5-substituted-2-norbornene is used in an amount of about 1 to about 15 parts by weight per 100 parts by weight of the acrylate ester (compound A). Acrylic rubbers having the best processability and the highest vulcanization speeds can be obtained when it is used in an amount of 4 to 9 parts by weight. If the amount is less than about 1 part by weight, the speed of vulcanization of the resulting acrylic rubber is low, and if it is larger than about 15 parts by weight, many cross-linkages occur during polymerization, and the resulting rubber has poor processability.

According to the required service of the vulcanized rubbers, another monomer (compound C) is used in preparing the acrylic copolymer rubber. Examples of compound C are alkyl methacrylates containing 1 to 3 carbon atoms (such as methyl methacrylate, ethyl methacrylate or propyl methacrylate), acrylonitrile, styrene, α-methylstyrene, halogenated styrenes, vinyltoluene, methacrylonitrile, acrylamide, and N-methylol acrylamide. These compounds can be used either alone or as admixture of two or more. They are characterized by having hydrophilicity, crystallinity or high cohesive energy, and are used to improve the hydrolysis resistance, electrical characteristics, oil resistance, and thermal stability, etc., of the acrylic rubbers. A suitable amount of compound C is at most about 30 parts by weight. Amounts exceeding about 30 parts by weight are undesirable because they reduce the rubber elasticity of the resulting copolymer.

The sulfur-vulcanization accelerator that does not cause degradative chain transfer in radical polymerization includes, for example, 2-mercaptobenzothiazole, dibenzothiazyl disulfide, 2-(2′,4′-dinitrophenylthio) benzothiazole, a cyclohexylamine salt of 2-mercaptobenzothiazole, 2-(N,N-diethylthiocarbamoylthio) benzothiazole, 2-(4′-morpholinodithio) benzothiazole, N-cyclohexyl-2-benzothiazolyl sulfenamide, N-tert-butyl-2-benzothiazolyl sulfenamide, N-oxydiethylene-2-benzothiazolyl sulfenamide, N,N-diisopropyl-2-benzothiazolyl sulfenamide, N,N-dicyclohexyl-2-benzothiazolyl sulfenamide, tetramethyl thiuram disulfide, tetraethyl thiuram disulfide, tetrabutyl thiuram disulfide, tetramethyl thiuram monosulfide, and 4,4′-dithiomorpholine. They are used either alone or in admixture of two or more.

A simple test enables one to easily differentiate sulfur-vulcanization accelerators that do not cause degradative chain transfer in radical polymerization as compared to those that do cause such degradative chain transfer. Essentially, one merely conducts the polymerization of the present invention and, if the yield is extremely poor, it can be concluded that a degradative chain transfer has occurred. The test is quite simple, and can easily be practiced by one skilled in the art.

These compounds typified by 2-mercaptobenzothiazole generally cause chain transfer during polymerization, and produce an effect of reducing the molecular weight of acrylic rubbers and enhancing their processability. This effect is the same as those of substances generally known as chain transfer agents such as dodecyl mercaptan. Since the compounds used in this invention are further bonded to the terminals or norbornene moiety of the resulting polymer after inducing such a chain transfer reaction, they exhibit an outstanding effect of promoting the subsequent sulfur vulcanization reaction in addition to their contribution to the improvement of processability. Moreover, they are effective for improving the properties of the resulting vulcanized rubbers. These compounds are therefore much better than chain transfer agents generally used in the art, and in this sense, can be termed sulfur-vulcanization accelerators that do not cause degradative chain transfer.

Good results are obtained when this accelerator is used in an amount of about 0.05 to about 3.0 parts by weight per 100 parts by weight of a mixture of compounds (A) and (B) or a mixture of compounds (A), (B) and (C). If it is less than about 0.05 part by weight, gellation occurs during polymerization, and the effect of its addition is reduced. Amounts exceeding about 3 parts by weight are unsuitable because they cause low yields or viscosities of the resulting acrylic rubbers.

The amount of double bonds introduced into a polymer by copolymerizing a norbornene compound in accordance with this invention can be measured by iodine value thereof.

Copolymers having an iodine value of about 8 to about 18 (at charging, the norbornene compound is about 4 to 19 parts by weight based on 100 parts by weight of acrylic ester) show excellent vulcanization characteristics and workability. If the iodine value is smaller than about 8, the vulcanization rate becomes low. On the contrary, if the iodine value is larger than about 18, the vulcanization rate becomes high but thermal stability, ozone resistance, etc., of the vulcanized rubbers is deteriorated.

The acrylic rubbers in accordance with the present invention can be obtained by conventional radical polymerization methods as are generally practised in the art, such as emulsion polymerization, suspension polymerization, or solution polymerization. Either water-soluble or monomer-soluble radical polymerization initiators can be used in the radical polymerization. They include, for example, persulfates, peroxides, hydroperoxides, azo compounds, and redox catalysts. Preferred water-soluble initiators are ammonium persulfate and potassium persulfate. Suitable redox systems can be obtained by combining them with ferrous sulfate. Preferred monomer-soluble initiators include, for example, benzoyl peroxide and α,α'-azobisisobutyronitrile. A benzoyl peroxide/N,N-dimethyl aniline redox system gives good results.

The initiator is generally used in an amount of about 0.01 to about 4.0 parts by weight per 100 parts by weight of a mixture of compounds (A) and (B) or a mixture of compounds (A), (B) and (C). Where persulfates are used, amounts of 0.05 to 1.0 part by weight give good results, and where azo compounds or organic peroxide compounds are used, amounts of 0.3 to 2.0 parts by weight ensure good results.

When the polymerization is carried out by an emulsion polymerization method, 100 to 800 parts by weight of distilled water or deionized water and about 0.1 to 5.0 parts by weight of an ordinary emulsifier are used per 100 parts by weight of a mixture of compounds (A) and (B) or a mixture of compounds (A), (B) and (C).

The emulsifier may be of the anionic, cationic, or nonionic type. Typical anionic emulsifiers are sodium laurylsulfate, and sodium alkylnaphthalenesulfonates. Examples of cationic emulsifiers are cetyltriethyl ammonium chloride and alkyldimethylbenzyl ammonium chlorides. The nonionic emulsifiers include, for example, polyethylene (aliphatic alcohol) ethers and polyglycol aliphatic esters. After the polymerization, the emulsion is broken by neutralizing the colloid charges or by dehydration. For the neutralization of colloid charges, calcium chloride, hydrochloric acid, and poly (sodium acrylate), for example, are used advantageously as salting-out agents.

For solution polymerization, solvents having a low coefficient of chain transfer, such as chlorobenzene, cyclohexane, benzene, ethyl acetate, toluene, and methyl ethyl ketone are suitably used.

In suspension polymerization, various suspension stabilizers can be used. They include, for example, natural polymers such as starch or gelatin, carboxyl-containing synthetic polymers such as polyacrylic acid or its sodium salt, alcoholic hydroxyl-containing synthetic polymers such as polyvinyl alcohol, and powdery inorganic substances such as talc, bentonite or barium sulfate. Good results are obtained when 0.01 to 3.0 parts by weight of polyvinyl alcohol or poly (sodium acrylate) is used per 100 parts by weight of water.

The reaction temperature used in polymerization is $-15°$ to $95°$ C., as is generally employed in the art to obtain good results.

Many Useful radical polymerization methods are disclosed in the following references:

U.S. Pat. No. 3,402,158 Col. 2, lines 10–19;
"Rubber World", June, 1974 pages 42–47

Page 43, Col. 1, line 23: The use of VAZO (α,α'-azobisisobutyronitrile) as a radical polymerization initiator in a solution process;

Page 43, Col. 2, line 3: The use of potassium persulfate as a radical polymerization initiator in an emulsion process;

| "Rubber Age", December, 1952 pages 353–362 | |
|---|---|
| Page 353, Table I | The use of ammonium persulfate |
| Page 356, Table II | |
| Page 357, Table III: | The use of potassium persulfate as a radical polymerization initiator. |

Rubber blends can be obtained easily from the resulting acrylic rubbers by conventional mixing methods using a Banbury mixer or open rolls, for example. As will be apparent to one skilled in the art from the heretofore offered discussion, the conditions selected for vulcanizing the materials of the present invention are not especially limited. However, on a commercial scale, generally excellent results are obtained when vulcanization is conducted utilizing a pressure of from about 3 to about 20 kg/cm$^2$, a temperature of from about 120° to about 200° C., and a time of from about 20 to 60 minutes. The present invention should not be construed as limited to the above.

The following Examples are given together with a Comparative Example in order to illustrate the embodiments of the invention in greater detail.

In these examples, all parts and percentages are by weight, and the properties of the vulcanizates were measured by the methods described in JIS-K 6301. Unless otherwise indicated, all conditions in the Examples and Comparative Examples were at atmospheric pressure.

Comparative Example

Suspension polymerization was carried out in accordance with the following recipe.

| | | |
|---|---|---|
| (I) | Ethyl acrylate | 100.0 parts |
| | Ethylidene norbornene | 5.8 parts |
| | N,N-dimethyl aniline | 1.0 parts |
| | Distilled water | 400.0 parts |

-continued

|      |                            |             |
|------|----------------------------|-------------|
| (II) | Poval B-17 (Note 1)        | 0.1 parts   |
|      | Neopelex-05-Powder (Note 2)| 0.003 parts |
|      | Benzoyl peroxide           | 1.5 parts   |
| (III)|                            |             |
|      | Benzene                    | 15.0 parts  |

(Note 1): Trademark for polyvinyl alcohol, a product of Denki Kagaku Kogyo Kabushiki Kaisha.
(Note 2): Trademark for sodium lauryl benzenesulfonate, a product of Kao-Atlas Co., Ltd.

Composition (II) was placed in a flask, and then composition (I) was added. These ingredients were stirred in an atmosphere of nitrogen, and then maintained at a temperature of 3° to 5° C. Composition (III) was then added dropwise to the mixture in the flask through a dropping funnel, and the polymerization was performed at 3° to 5° C. The exothermal heat from the reaction was most vigorous in about 2 to 2.5 hours after the beginning of the addition, and the reaction mixture was stirred for an additional 4 hours to complete the polymerization reaction.

The resulting copolymer was in the form of pale brown pearl-like particles with a diameter of 0.2 to 1 mm. The yield of the copolymer was 92 to 96%. The resulting pearl-like particles were washed with water, and then dried at 55° C. under reduced pressure. The dried polymer was extracted with acetone for 24 hours using a Soxhlet extractor. The acetone-insoluble portion of the polymer was determined to be 50 to 70% by weight.

The polymer was compounded and mixed by open rolls in accordance with the recipe shown in Table 1, and vulcanized with a sulfur vulcanizer at 150° C. and 5 Kg/cm² for 20 minutes.

The roll workability and Mooney viscosity of the rubber compound and the properties of the resulting vulcanizate are shown in Table 2.

The roll workability of the rubber compounds was evaluated on a scale of A, B, C and D as follows:

A (excellent): The compound bonded around the rolls smoothly, and could be very easily mixed.
B (good): The compound bonded around the rolls with little stickiness on the roll surface, and could be easily mixed. But its thrust among the rolls was somewhat poor.
C (fair): The compound bonded around the rolls but tended to depart therefrom; it could be mixed, however.
D (poor): The compound did not at all bond around the rolls (did not become sheeting), and could not be mixed.

Table 1

| Polymer                        | 100 parts |
|--------------------------------|-----------|
| Show Black "O" (Note 3)        | 40 parts  |
| Zinc oxide No. 3               | 5 parts   |
| Stearic acid                   | 1 parts   |
| Dibenzothiazyl disulfide       | 0.5 parts |
| Cadmium diethyldithiocarbamate | 3.8 parts |
| Sulfur                         | 0.5 parts |

(Note 3): Trademark for HAF black, a product of A A Chemical Co., Ltd.

Table 2

| Roll workability evaluation   | C                          |
|-------------------------------|----------------------------|
| Mooney viscosity              | 92 ML$_1$ $_{+4}$ (100° C.)|
| Hardness (JIS A type) (°)     | 76                         |
| 300% Modulus (Kg/cm²)         | 95                         |
| Tensile strength (Kg/cm²)     | 110                        |

Table 2-continued

| Roll workability evaluation | C                          |
|-----------------------------|----------------------------|
| Mooney viscosity            | 92 ML$_1$ $_{+4}$ (100° C.)|
| Elongation (%)              | 400                        |

EXAMPLE 1

Suspension polymerization was carried out in accordance with the following recipe.

|       |                             |             |
|-------|-----------------------------|-------------|
|       | Ethyl acrylate              | 80 parts    |
| (I)   | Ethylidene norbornene       | 6 parts     |
|       | 2-Mercaptobenzothiazole     | 0.25 parts  |
|       | N,N-dimethylaniline         | 1.5 parts   |
|       | Distilled water             | 400 parts   |
| (II)  | Poval B-17 (Note 1)         | 0.1 parts   |
|       | Neopelex-05-Powder (Note 2) | 0.003 parts |
|       | Ethyl acrylate              | 20 parts    |
| (III) |                             |             |
|       | Benzoyl peroxide            | 1.5 parts   |

The polymerization procedure was the same as in the Comparative Example except that the reaction temperature was maintained at 2° to 8° C., and the reaction time was 6 hours. The yield of the polymer was 92%.

The acetone-insoluble portion of the resulting polymer was determined in the same way as in the Comparative Example to be 20% by weight. This clearly substantiates that the gel content of the polymer is reduced over the polymer obtained in the Comparative Example.

The resulting polymer was compounded in accordance with the recipe shown in Table 3 and mixed and vulcanized in the same way as in the Comparative Example to afford a vulcanized rubber.

Table 3

| Polymer               | 100 parts |
|-----------------------|-----------|
| Show black "O"        | 40 parts  |
| Zinc oxide No. 3      | 5 parts   |
| Stearic acid          | 1 parts   |
| Accelerator EZ (Note 4)| 0.5 parts|
| Accelerator M (Note 5)| 0.5 parts |
| Sulfur                | 2.0 parts |

(Note 4): Zinc diethyldithiocarbamate
(Note 5): 2-Mercaptobenzothiazole (sulfur-vulcanization accelerator which does not cause degradative chain transfer; hereafter the same unless otherwise indicated)

The roll workability and the Mooney viscosity of the resulting rubber compound, and the properties of the vulcanizate were determined, and the results are shown in Table 4.

Table 4

| Roll workability evaluation         | A                          |
|-------------------------------------|----------------------------|
| Mooney viscosity                    | 32 ML$_1$ $_{+4}$ (100° C.)|
| Hardness (JIS A type) (°)           | 74                         |
| 300% Modulus (Kg/cm²)               | 94                         |
| Tensile strength (Kg/cm²)           | 138                        |
| Elongation (%)                      | 485                        |
| Oil resistance (150° × 70 hr, ASTM No. 3 oil) |                  |
| Weight change (%)                   | 8                          |
| Volume Change (%)                   | 14                         |
| Tensile strength change (%)         | −4                         |
| Elongation change (%)               | −33                        |

The Mooney viscosity of the compound was considerably lower than that of the Comparative Example, and this shows that the compound obtained in accordance with this invention has better ease of flowing into a mold. The roll workability of the compound in mixing was also better. Furthermore, it can be seen from the rheometer cure curves shown in FIG. 1 that the rubber compound obtained in this Example shows a low initial torque and a steep rising gradient, which are the characteristics of an ideal rubber. In other words, the vulcanization time can be shortened, and there is little variation in properties according to differences in the valcanization time. In order to evaluate the optimum vulcanization time, t90 (the time needed to reach 90% of the constant torque which no longer changes with time) was measured from the rheometer curves. It was found to be 15 minutes in the case of (A) of Example 1, and 20 minutes in the case of (B) of the Comparative Example. Using t10 similarly obtained and considering t90-t10 as one indication of the vulcanization rate, Example 1 was 10 minutes and the Comparative Example was 16 minutes, and it was found that Example 1 was larger than the Comparative Example in vulcanization rate.

Accordingly, the copolymer obtained in accordance with the present invention fully meets the various requirements desired, for example, processability characteristics such as ease of flow into molds, or the ease of roll working, shortening of the vulcanization time, and little variation in properties according to differences in the vulcanization time.

The properties of the vulcanized rubber were also found to show improvements over those of the vulcanizate obtained in Comparative Example.

EXAMPLE 2

Emulsion polymerization was performed under the following conditions using the following recipe, and after salting-out, in a conventional manner a polymer was obtained.

Table 5

| | |
|---|---|
| Ethyl acrylate | 100 parts |
| Ethylidene norbornene | 6 parts |
| 2-Mercaptobenzothiazole | 0.5 parts |
| Potassium persulfate | 0.1 parts |
| Distilled water | 200 parts |
| Neopelex-05-Powder | 4 parts |

Table 5-continued

| | |
|---|---|
| Reaction time (hours) | 6 |
| Reaction temperature (°C.) | 65–70 |
| Salting-out method | With an aqueous solution containing 3.5% hydrochloric acid and 17% Aron A-20L (Note 6) |
| Yield (%) | 95 |

(Note 6): Aron A-20L is a trademark for poly (sodium acrylate) having a degree of polymerization of 2,700 to 7,500, a product of Toa Gosei Chemical Industry Co., Ltd. The salting-out method is conventional and is described in "Rubber Age", December, 1952 page 356, Col. 1, the item "Coagulating and Washing" and "Rubber World", June, 1974, page 43, Col. 2, lines 12–14.

The resulting polymer was mixed by open rolls in accordance with the recipe shown in Example 1, and vulcanized at 150° C. and 5 Kg/cm$^2$ for 20 minutes. The roll workability and the Mooney viscosity of the rubber compound, and the properties of the vulcanizate were determined, and the results are shown in Table 6.

Table 6

| | |
|---|---|
| Roll workability evaluation | A |
| Mooney viscosity | 55 ML$_{1+4}$ (100° C.) |
| Hardness (JIS A type) (°) | 71 |
| 100% Modulus (kg/cm$^2$) | 62 |
| Tensile strength (Kg/cm$^2$) | 141 |
| Elongation (%) | 225 |

The iodine value of the copolymer obtained in this example was 12.0; this corresponds to an ethyl acrylate/ethylidene norbornene ratio of 100/6.03 (wt. ratio).

EXAMPLE 3

In each run, suspension polymerization was performed in accordance with the recipes and conditions shown in Table 7, and the polymer obtained was compounded and mixed in accordance with the recipes shown in Table 7. The properties of the compounds and the vulcanizates were measured, and the results are also shown in Table 7. Essentially, the same operations as were used in Example 1 were used in this example; the polymerization is quite conventional.

Table 7

| Run No. | 1 | 2 | 3 | 4 | 5 | 6 | 7 | 8 | 9 | 10 |
|---|---|---|---|---|---|---|---|---|---|---|
| Ethyl acrylate (parts) | 100 | 100 | 100 | 80 | 100 | 100 | 80 | 100 | 100 | 100 |
| Butyl acrylate | | | | | | | | | | |
| Ethylidene norbornene | 4 | 6 | 6 | 6 | 3 | 12 | 6 | 6 | 6 | 6 |
| 2-Mercaptobenzothiazole | 1 | 1 | 0.5 | 1 | 0.5 | 0.5 | 1 | 1 | 1 | 1 |
| Benzoyl peroxide | 1.5 | 1.5 | 1.5 | 2 | 1.5 | 1.5 | 1.5 | 2 | 1 | |
| N,N-dimethyl aniline | 1.5 | 1.5 | 1.5 | 1.5 | 1.5 | 1.5 | 1.5 | | | |
| α,α'-azobisisobutyronitrile | | | | | | | | | | 1 |
| Methyl methacrylate | | | | | | | | 20 | | |
| Reaction time (hr) | 6 | 6 | 5 | 6 | 5 | 8 | 5 | 4 | 4 | 4 |
| Reaction temperature (°C.) | 2–8 | 2–8 | 2–8 | 2–8 | 2–8 | 2–8 | 2–8 | 70 | 70 | 70 |
| Yield (%) | 91 | 81 | 90 | 85 | 87 | 82 | 95 | 82 | 81 | 95 |
| Polymer | 100 | 100 | 100 | 100 | 100 | 100 | 100 | 100 | 100 | 100 |
| Show Black "O" | 40 | 40 | 40 | 40 | 40 | 40 | 40 | 40 | 40 | 40 |
| Zinc oxide No. 3 | 5 | 5 | 5 | 5 | 5 | 5 | 5 | 5 | 5 | 5 |
| Stearic acid | 1 | 1 | 1 | 1 | 1 | 1 | 1 | 1 | 1 | 1 |
| Accelerator EZ* | 0.5 | 0.5 | 0.5 | 0.5 | 0.5 | 0.5 | 0.5 | 0.5 | 0.5 | 0.5 |
| Accelerator M* | 0.5 | 0.5 | 0.5 | 0.5 | 0.5 | 0.5 | 0.5 | 0.5 | 0.5 | 0.5 |
| Sulfur | 2.0 | 2.0 | 2.0 | 2.0 | 2.0 | 2.0 | 2.0 | 2.0 | 2.0 | 2.0 |
| Roll Workability | B | B | A | B | A | A | B | B | B | B |
| Mooney viscosity (ML$_1$ + 4; 100° C.) | 41 | 32 | 40 | 24.5 | 41.5 | 30 | 56 | 24 | 34 | 31 |
| Hardness (JIS A;°) | 67 | 69 | 70 | 69 | 70 | 76 | 84 | 82 | 83 | 82 |
| 100% Modulus (Kg/cm$^2$) | 21 | 22 | 27 | 20 | 20 | 75 | 52 | 45 | 53 | 49 |
| 300% Modulus (Kg/cm$^2$) | 73 | 70 | 83 | 75 | 67 | — | 140 | 129 | — | — |
| Tensile stength (Kg/cm$^2$) | 106 | 110 | 120 | 100 | 110 | 140 | 152 | 132 | 125 | 129 |

Table 7-continued

| Run No. | 1 | 2 | 3 | 4 | 5 | 6 | 7 | 8 | 9 | 10 |
|---|---|---|---|---|---|---|---|---|---|---|
| Elongation (%) | 475 | 520 | 470 | 450 | 500 | 250 | 325 | 307 | 263 | 275 |

*As earlier identified.

The results shown in Table 7 demostrate that in these runs also, the processability of the rubber compounds and the properties of the vulcanizates are superior to the Comparative Example.

EXAMPLE 4

Suspension polymerization was performed in accordance with the following recipe.

| | | Invention | Comparison |
|---|---|---|---|
| (I) | Ethyl acrylate | 90 parts | 90 parts |
| | Ethylidone norbornene | 6 | 6 |
| | N,N-dimethyl Dimethyl aniline | 0.6 | 0.6 |
| | 2-Mercaptobenzothiazole | 0.1 | — |
| | Dodecyl mercaptan | — | 0.1 |
| | Distilled water | 400 | 400 |
| (II) | Poval B-17 (Note 1) | 1.5 | 1.5 |
| | Neopelex-05-Powder (Note 2) | 0.003 | 0.003 |
| | Benzoyl peroxide | 0.6 | 0.6 |
| (III) | Ethyl acrylate | 10 | 10 |

(Note 1): A trademark for 7% aqueous solution of polyvinyl alcohol, a product of Denki Kagaku Kogyo Kabushiki Kaisha (partially saponified polyvinyl acetate; Degree of polymerization 1700; Degree of saponification 87–89 mole%)
(Note 2): A trademark for sodium lauryl benzene-sulfonate, a product of Kao-Atas Co., Ltd.

Composition (II) was placed into a flask and then composition (I) was added. They were stirred in an atmosphere at nitrogen, and maintained at a temperature of 3° C. Composition (III) was added dropwise to the mixture through a dropping funnel over the course of 40 minutes, and the polymerization was performed at the same temperature. After the addition, stirring was continued for 6 hours to complete the polymerization reaction. The yield of the polymer was 87% in both It is clear from Table 9 that the rheometer $t_{90}$ values were the same both in the invention and in the comparison, but the scorch time was longer in the invention. This means that the unvulcanized rubber compound in accordance with the invention has better processability.

Figure 2:
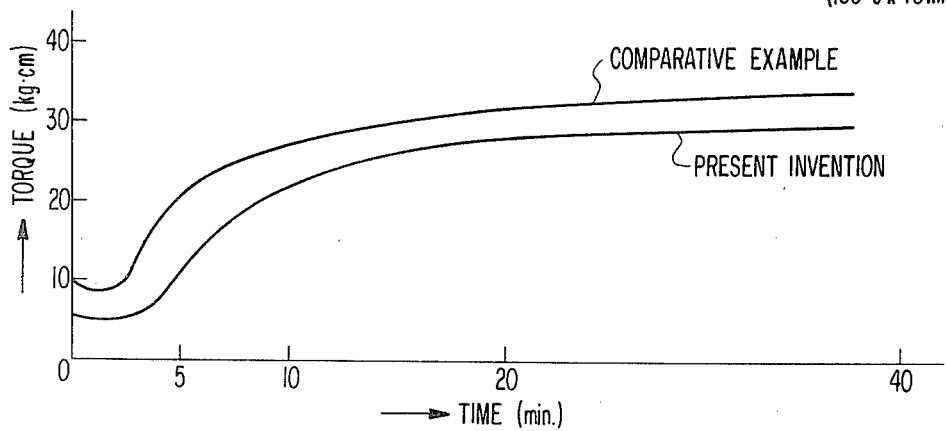
FIG. 2 shows a rheometer curve of Example 4 and the Comparative Example for the sake of comparison.

It can further be seen that the Mooney viscosities of the unvulcanized compounds at 100° C. were the same for the invention and the comparison, but the compound of this invention has a low viscosity at 153° C. (as can be seen from the rheometer cure curves shown in FIG. 2). Thus, the copolymer in accordance with this invention is a rubber having good processability whose viscosity is largely temperature-dependent.

The properties of the vulcanized rubbers were measured, and the results are shown in Table 10. The results demonstrate that the vulcanized rubber of the invention has superior tensile strength and elongation to that of the comparison.

Table 10

| Properties of vulcanized rubbers (vulcanized at 153° C. under 5 Kg/cm² for 30 minutes) | | |
|---|---|---|
| | Invention | Comparison |
| 100% Modulus (Kg/cm$^2$) | 38 | 40 |
| Tensile strength (Kg/cm$^2$) | 143 | 132 |
| Elongation (%) | 500 | 400 |

EXAMPLE 5

In this example, a copolymer was prepared in the absence of a sulfur vulcanization accelerator which did not cause degradative chain transfer for comparison with a copolymer in accordance with the invention. Polymerization was performed by an emulsion poly-

Table 11-continued
(Vulcanized at 153° C. under 5 Kg/cm² for 30 minutes)

| Run No. | 1 | 2 | 3 | 4 | 5 | 6 |
|---|---|---|---|---|---|---|
| Sulfur | 2.0 | 1.0 | 2.0 | 1.0 | 2.0 | 1.0 |
| Accelerator TRA |  | 2.0 |  | 2.0 |  | 2.0 |
| Accelerator DM |  | 1.0 |  | 1.0 |  | 1.0 |

Accelerator TRA: Dipentamethylenethiuram tetrasulfide
Accelerator DM: Dibenzothiazyl disulfide
*as earlier identified.

In Run Nos. 3 and 4, the same amount of 2-mercaptobenzothiazole as charged at the time of preparing the plymer of this invention was added to the comparison polymer during the mixing operation. Hence, from the results of these six runs, it is clear that there is a difference between the effect of adding 2-mercaptobenzothiazole at the time of polymerization and the effect of adding it during roll mixing.

The results are shown in the following.

Mooney viscosity and scorch time of rubber compound

| Run No. | $ML_{1+4}$ (100° C.) | $MS_{1+t\Delta 5}$ (120° C.) | Minimum scroch value |
|---|---|---|---|
| 1 | 90 | 6.5 | 54.5 |
| 2 | 85 | 32.5 | 40.5 |
| 3 | 86 | 8.0 | 40.0 |
| 4 | 77 | 17.0 | 37.0 |
| 5 | 65 | 8.5 | 35.0 |
| 6 | 63 | 16.0 | 33.0 |

Properties of vulcanized rubbers (vulcanized at 153° C. under 5 Kg/cm² for 30 minutes)

| Run No. | 100% Modulus (Kg/cm²) | Tensile strength (Kg/cm²) | Elongation (%) |
|---|---|---|---|
| 1 | 49 | 127 | 290 |
| 2 | 50 | 130 | 270 |
| 3 | 53 | 136 | 240 |
| 4 | 53 | 138 | 260 |
| 5 | 48 | 150 | 280 |
| 6 | 47 | 152 | 275 |

It is clear from the results obtained that the copolymers in accordance with this invention have a low Mooney viscosity, and vulcanizates obtained therefrom have increased tensile strength without reduction of their elongation.

To confirm that 2-mercaptobenzothiazole is bonded in the copolymers obtained, the following Reference Example is offered.

This Reference Example is not a working example of the present application and is merely to confirm the indicated bonding, and, therefore, the amount of 2-mercaptobenzothiazole was as large as 10 parts by weight. This is due to the fact that the use of 2-mercaptobenzothiazole in an amount as is used in the Examples is impossible to measure. Further, solution polymerization was employed as the polymerization method since it is most preferred for measurement. The solution polymerization method was conventional.

REFERENCE EXAMPLE

In order to confirm the fact that 2-mercaptobenzothiazole was introduced in the polymer, solution polymerization was carried out in accordance with the following recipe.

| | |
|---|---|
| Ethyl acrylate | 100 parts by weight |
| Ethylidene norbornene | 6 parts by weight |
| 2-Mercaptobenzothiazole | 10 parts by weight |
| α, α'Azobisisobutyronitrile | 1.5 parts by weight |
| n-Heptane | 200 |
| Reaction temperature | 70° C. |
| Reaction time | 3 hrs |

The polymer obtained was treated by means of column chromatography to separate unreacted 2-mercaptobenzothiazole and to recover only a product wherein 2-mercaptobenzothiazole was introduced into the polymer. It was confirmed that 2-mercaptobenzothiazole was introduced into the polymer by means of ultraviolet ray spectroscopic analysis.

Further, the polymer obtained was dissolved in 10 times by weight per the weight of the polymer of a mixed solvent of methanol/N,N-dimethyl aniline (1/1 weight ratio) and was subjected to column chromatography using as a carrier 100 mesh silica gel ("Wakogel C-100", Wako Pure Chemical Ind. Ltd.). The main distillate was composed of two components. It was confirmed from the melting point that one component was unreacted 2-mercaptobenzothiazole. Another component was subjected to infrared spectroscopic analysis, and, as a result, the absorption which was not observed with a polymer prepared in the same manner as above but using no 2-mercaptobenzothiazole was observed at the wavelength region of 1610, 1515 and 940 cm⁻¹. It was therefore concluded that 2-mercaptobenzothiazole reacted with and was introduced into the polymer.

While the invention has been described in detail and with reference to specific embodiments thereof, it will be apparent to one skilled in the art that various changes and modifications can be made therein without departing from the spirit and scope thereof.

What is claimed is:

1. An acrylic copolymer obtained by the radical polymerization of a monomeric mixture consisting essentially of 100 parts by weight of at least one acrylic acid ester of an aliphatic alcohol containing 1 to 8 carbon atoms and about 1 to about 15 parts by weight of a 5-substituted-2-norbornene of the general formula

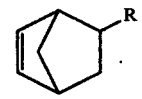

wherein R represents $=CH+CH_2)_xCH_3$, in which x is 0 to 4, or $-CH=CH_2$,
in the presence of about 0.1 to about 3.0 parts by weight, per 100 parts by weight of the monomeric mixture, of 2-mercaptobenzothiazole.

2. The acrylic copolymer of claim 1 wherein the acrylic acid ester is ethyl acrylate.

3. The acrylic copolymer of claim 1 wherein the acrylic acid ester is n-butyl acrylate.

4. The acrylic copolymer of claim 1 wherein R in the 5-substituted-2-norbornene is $=CH+CH_2)_xCH_3$, in which x is 0 to 4.

5. The acrylic copolymer of claim 4 wherein R in the 5-substituted-2-norbornene is $=CH-CH_3$.

6. The acrylic copolymer of claim 4 wherein R in the 5-substituted-2-norbornene is $=CH-CH_2-CH_3$.

7. The acrylic copolymer of claim 1 wherein R in the 5-substituted-2-norbornene is $-CH=CH_2$.

8. An acrylic copolymer obtained by the radical polymerization of a monomeric mixture consisting essentially of 100 parts by weight of at least one acrylic acid ester of an aliphatic alcohol containing 1 to 8 carbon atoms, about 1 to about 15 parts by weight of a 5-substituted-2-norbornene of the general formula

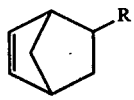

wherein R represents $=CH(CH_2)_xCH_3$, in which x is 0 to 4, or $-CH=CH_2$, and not more than 30 parts by weight of acrylonitrile, in the presence of about 0.1 to about 3.0 parts by weight, per 100 parts by weight of the monomeric mixture, of 2-mercaptobenzothiazole.

9. The acrylic copolymer of claim 8 wherein the acrylic acid ester is ethyl acrylate.

10. The acrylic copolymer of claim 8 wherein the acrylic acid ester is n-butyl acrylate.

11. The acrylic copolymer of claim 8 wherein R in the 5-substituted-2-norbornene is $=CH(CH_2)_xCH_3$, in which $x$ is 0 to 4.

12. The acrylic copolymer of claim 11 wherein R in the 5-substituted-2-norbornene is $=CH-CH_3$.

13. The acrylic copolymer of claim 11 wherein R in the 5-substituted-2-norbornene is $=CH-CH_2-CH_3$.

14. The acrylic copolymer of claim 8 wherein R in the 5-substituted-2-norbornene is $-CH=CH_2$.

15. An acrylic copolymer obtained by the radical polymerization of a monomeric mixture consisting essentially of 100 parts by weight of at least one acrylic acid ester of an aliphatic alcohl containing 1 to 8 carbon atoms, about 1 to about 15 parts by weight of a 5-substituted-2-norbornene of the general formula wherein R represents $=CH-(CH_2)_xCH_3$, in which x is 0 to 4, or $-CH=CH_2$, and not more than about 30 parts by weight of an alkyl methacrylate in which the alkyl group contains 1 to 3 carbon atoms, in the presence of about 0.1 to about 3.0 parts by weight, per 100 parts by weight of the monomeric mixtufe, of 2-mercaptobenzothiazole.

16. The acrylic copolymer of claim 15 wherein the acrylic acid ester is ethyl acrylate.

17. The acrylic copolymer of claim 15 wherein the acrylic acid ester is n-butyl acrylate.

18. The acrylic copolymer of claim 15 wherein R in the 5-substituted-2-norbornene is $=CH-(CH_2)_xCH_3$, in which $x$ is 0 to 4.

19. The acrylic copolymer of claim 18 wherein R in the 5-substituted-2-norbornene is $=CH-CH_3$.

20. The acrylic copolymer of claim 18 wherein R in the 5-substituted-2-norbornene is $=CH-CH_2-CH_3$.

21. The acrylic copolymer of claim 15 wherein R in the 5-substituted-2-norbornene is $-CH=CH_2$.

22. The acrylic copolymer of claim 15 wherein the alkyl methacrylate is methyl methacrylate.

23. The acrylic copolymer of claim 15 wherein the alkyl methacrylate is ethyl methacrylate.

* * * * *